PERFORMANCE OF FLASH ZONE TEMPERATURE REGULATION
(Typical Operation)

TYPICAL PATTERNS FOR FLASH ZONE CONTROL
BY DIFFERENT MODES

PERFORMANCE OF DFO CONTROL LOOP

United States Patent Office 3,463,725
Patented Aug. 26, 1969

3,463,725
FRACTIONATING TOWER COMPUTER CONTROL
Benedict Macfarlane, White Plains, N.Y., and Charles A. Jones III, Haddonfield, N.J., assignors to Mobil Oil Corporation, a corporation of New York
Filed July 25, 1967, Ser. No. 655,873
Int. Cl. B01d 3/42; C10g 7/00
U.S. Cl. 208—358    3 Claims

ABSTRACT OF THE DISCLOSURE

This invention is directed to the computer control of a fractionating tower for the separation of petroleum products. The tower is controlled by adjustment of the flow rates of the top, bottom and intermediate refluxes and the draw rate for the product stream. A two-part control scheme, having primary control loops in which the set point is adjusted by a secondary control loop, is provided for the intermediate and bottom reflux rates. An on-line computer is used in both the primary loop (such as to calculate the intermediate reflux flow rate to maintain a specified heat removal, and to control bottom reflux rate to maintain a specified tower bottom temperature) and secondary loop (such as to maintain a specific liquid/vapor ratio at the tower top by adjusting the intermediate reflux flow rate set point and to maintain a specified tower bottom internal reflux by adjusting the set point for the bottom external reflux rate). The product stream draw-off rate is also controlled by the on-line computer.

Background

The control of fractionating towers has traditionally been carried out by operator adjustment of flow rates in response to observed temperatures and other parameters. In recent years the use of computers has made more sophisticated control schemes possible. The computer, as an on- and off-line instrument, can deal with the many parameters involved and make complex calculation to determine what adjustments in the system are necessary to meet predetermined specifications. Patent 3,224,947 is an example of the use of a computer for controlling the flow rates within a fractionating column. This patent discloses a system for computing the ratio of vapor to liquid flows within the column and for controlling the column operation to maintain this ratio at a preselected value. Copending patent application 562,808 discloses a system for tower control based upon a more rigorous heat and material balance analysis of tower operations.

Summary

An embodiment of this invention is the control of a fractionating tower for the separation of a product stream from a catalytic cracking reactor. The feedstream to the fractionator is separated into an overhead gasoline product, a portion of which is returned to the top of the tower, at least one intermediate product removal such as light fuel, a portion of which is returned to an intermediate point in the tower, and a bottoms removal of heavy fuel, a portion of which is returned to the tower feedstream. The bottom and intermediate reflux loops are integrated into a two-part control scheme. Primary regulation is obtained by flow-control of the two reflux streams to operator specified set points. In secondary regulation the computer will specify the primary set point based on an internal tower condition calculated by the computer. The desired internal condition is specified by the operator. The intermediate product wthdrawal is independent of the secondary control program and is held to a desired quality (distillation point) by adjustment of the drawoff rate. The top of the tower may be controlled by a completely analog system comprising a temperature controller, preferably with a cascade set point adjustment responsive to a quality specification, such as distillation point. Alternatively the top of the tower could be controlled by the process computer.

The invention

In the operation of a catalytic cracking reactor, recycle feed for the reactor is obtained from the synthetic crude tower, which in itself receives reactor effluent. A change in the reactor feedstock or in the reactor operation produces an immediate effect on the composition of the reactor effluent. However, because of the comparatively large volume of total liquid hold-up in the tower system and the number of passes required for equilibrium recycle, the quality of the recycle to the reactor changes gradually, which in its turn produces prolonged effects on the performance of the reactor. Thus the dynamics and control of the catalytic section are closely tied up with those of the fractionating section.

The ultimate goal for controlling the fractionating tower is to optimize its operation within the overall optimum refinery operation. Such operation is dependent on good, accurate regulation of the tower. Good stable column control is required in accordance with conditions set to meet product specifications as supplied by the refinery.

An objective of this invention is to regulate the tower to maximize the yield of valuable products and minimize total refinery (or catalytic cracking) operating costs. The general logic employed is to: maintain stable tower control within normal fluctuations and minor refinery upsets; provide the degree of fractionation on each stream commensurate with final refinery product specification; and to recover as much heat at as high a temperature level as possible with the existing catalytic cracking preheat exchanger system. The control scheme program of this invention, along with the modifications made to the conventional tower instrumentation, provide the regulation required to stabilize unit operations, minimize off-specification product, reduce line-out time, and operate closer to equipment constraints.

The invention will be described in conjunction with the embodiment of FIGURE 1A which shows a control scheme for a fractionator. The feedstream from a catalytic cracking unit enters the tower 1 at a point near the bottom. The major portion of the feed is vapor and rises in the tower. A certain portion of the vapor feed condenses on a lower plate 2 while the remainder continues to pass up the column. A certain portion of the feed remains in the vapor phase and leaves the uppermost plate 3 and exits from the tower. This portion of the feed is a combination of light gases and gasoline. The light products pass through a condenser 4 to drum 5. The product from the drum is a separated wet gas and gasoline. A portion of the gasoline is returned to the top of the tower through valve 6. Valve 6 is controlled by a temperature recorder controller (TRC) 7 which receives a signal from thermocouple (T) 8 situated to sense the temperature of the light products from the tower. The set point of TRC 7 is controlled in response to a signal from distillation analyzer (DA) 9. This and other distillation analyzers referred to below may be Model 622, Technical Oil Tool Co., Glendale, Calif. DA 9 receives a sample of the light products and in a conventional manner determines the 90% distillation point.

The depicted intermediate component withdrawal is a distillate fuel oil (DFO). The rate of DFO withdrawal is controlled by valve 10 which responds to flow recorder controller (FRC) 11 which in turn receives a signal from flow rate indicator (F) 12. FRC 11 is adjusted by means of set point station (SPS) 13. The set point stations referred to in this specification may be electric or pneumatic, an example of the latter is Model 67, Foxboro Co., Foxboro, Mass. SPS 13 receives control signals from computer section 14 which in turn is responsive to distillation analyzer 15. DA 15 is connected to receive a sample of DFO at a point adjacent to the tower, and operates in a manner similar to DA 9. A portion of the DFO is diverted to heat exchanger 16 and then back to the tower through valve 17. Valve 17 is controlled by a signal from FRC 18 which responds to flow rate indicator 19. FRC 18 is adjusted by means of SPS 20 which is controlled by computer section 21 to maintain a specified flow rate which will result in the removal of a predetermined amount of heat from the tower. The set point of programmed computer section 21, and in turn SPS 20 and FRC 18, is controlled by computer section 22 in accordance with a calculated liquid/vapor ratio at the top tray of the tower. This will be explained in further detail below.

T 23 senses the temperature in the bottom of the tower and transmits a signal to computer section 24 which generates a corrective signal based on a predetermined temperature. The computer signal is transmitted to SPS 25, which is connected to FRC 26, which in turn adjusts valve 27. FRC 26 also responds to flow rate indicator 28. Valve 27 controls the amount of bottoms product recycled through heat exchanger 29, from which the bottoms product is added to the tower feed. The set point of programmed computer section 24, and in turn SPS 25 and FRC 26, is adjusted by computer section 30 in accordance with a predetermined value calculated for the liquid returned from bottom plate 2. Computer sections 14, 21, 22, 24 and 30 have been referred to figuratively; they are all part of a single properly programmed digital computer 31.

The computer set point stations can be used to couple a Bunker-Ramo 340 process control computer 31 with the conventional closed loop analog control systems. The set stations can also be used with the IMB 1800 process control computer. The function of a set point station in a supervisory computer control system is to receive digital set point increments from the computer and to convert them into a continuous set point value for a conventional analog controller (FRC). In one specific type of operation a digital pulse train is transmitted from the computer to the set station to drive a bidirectional stepping motor. A second sustained contact closure is used to fix drive direction. Other modes of operation are available in commercial set point stations. The set station analog output signal to the process controller instrument is either a continuous pneumatic pressure or an electronic voltage. A voltage feedback signal to the computer is used to verify the set point position. Located on the face of the set station are adjustable high-and-low set point travel limit indices and a computer/manual transfer switch. Alarm status at a high or low limit and the position of the transfer switch are inputs to the computer.

In the use of the digital computer 31 additional information may be supplied concerning operation of the fractionator tower 1. The need for sensing these additional parameters is obvious from a consideration of the calculations performed by the digital computer in obtaining a heat and material balance around the tower. The additional parameters which are monitored by the computer are indicated in FIGURE 1B. In this figure the following symbols are employed: F—flow rate indicator; T—temperature sensing device; P—pressure indicator; L—fluid level indicator; C—chromatography; G—specific gravity analyzer; and A—distillation endpoint analyzer. Each of these devices may be of conventional construction and are commercially available. These devices sense the indicated parameters and transmit signals to computer 31 (not shown in FIGURE 1B). Although the system of FIGURE 1A discloses, as the ultimate control means, adjustment of flow rates for the quench, DFO, intermediate reflux and top reflux streams, it is clear that additional parameters could be controlled. For example, it may be noted that the withdrawal of the naphtha, recycle to catalytic cracking unit, and tower bottoms are monitored for flow rate, temperature and specific gravity; the flow rates of these streams could also be controlled by means of computer 31.

In addition to the above, FIGURE 1B shows two alternative embodiments of the present invention. The intermediate reflux stream need not necessarily be drawn from the distillate fuel oil product stream. The intermediate reflux may comprise a naphtha stream or as shown in FIGURE 1B the intermediate reflux may be a recycled stream drawn from any suitable point in the tower. The control scheme for the recycled stream may be that shown in FIGURE 1A.

An alternative embodiment of the analog control scheme for the top of the tower may comprise FRC 32 which controls valve 33 in response to flow indicator 34 and set point station 35. The set point station 35 responds to a signal from computer 31 which receives signals from DA 9 and T 8, in addition to signals representative of the other sensed parameters (DA 9, T 8 and computer 31 are shown in FIGURE 1A).

Figure 1A:
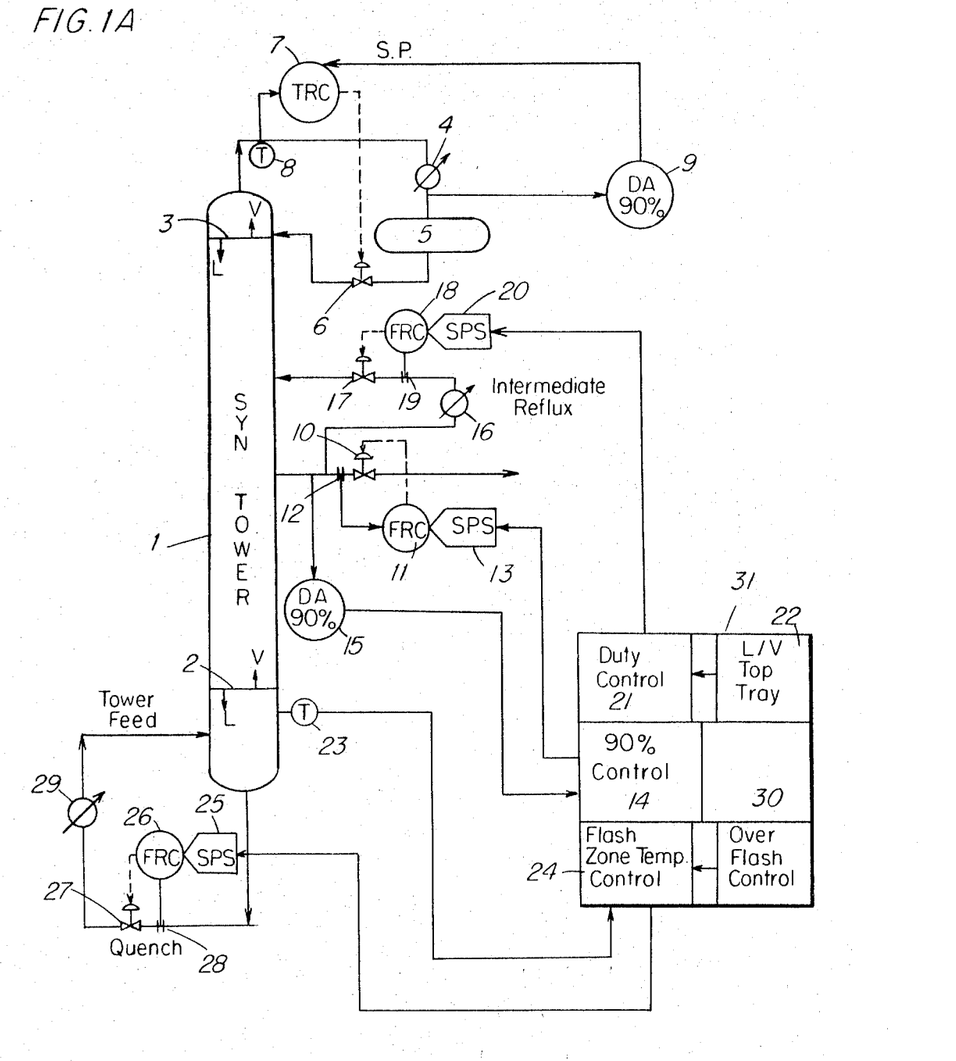
FIGURE 1A presents a system for the control of a fractionator.
Figure 1B:
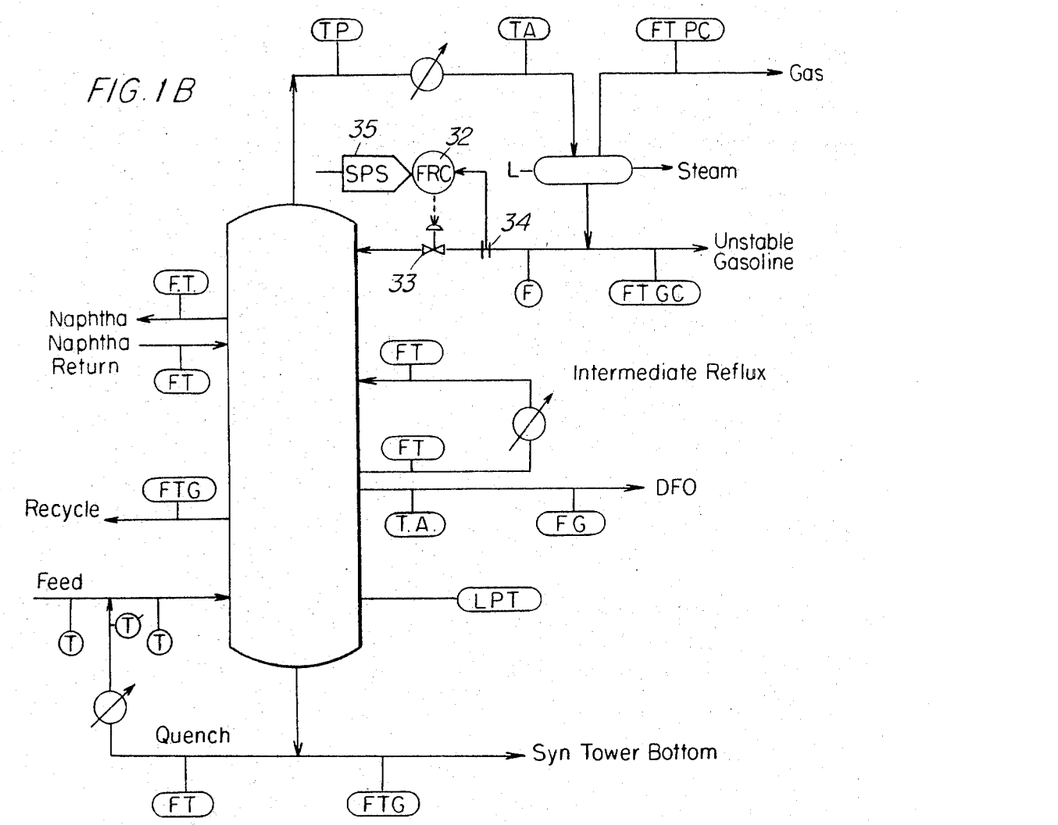
FIGURE 1B presents several additional details of the system of FIGURE 1A.
Figure 2A:
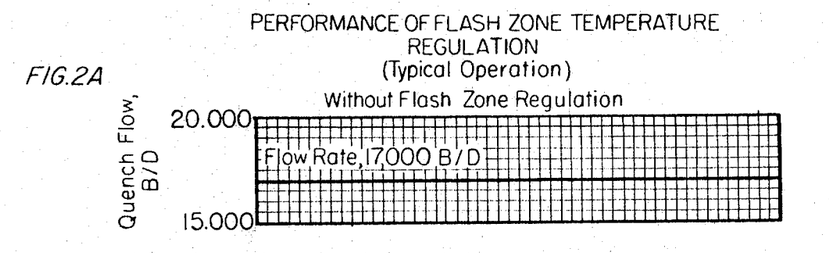
FIGURES 2A–2D, 3A–3D, 4A and 4B present data on comparisons between manual and computer control of a fractionator.
Figure 2B:
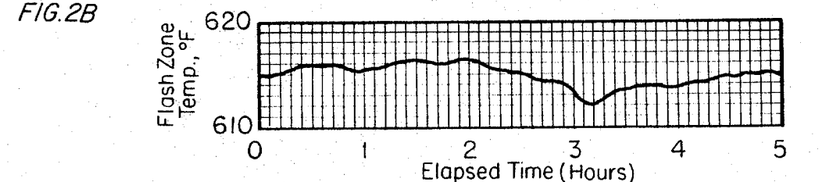
Figure 2C:
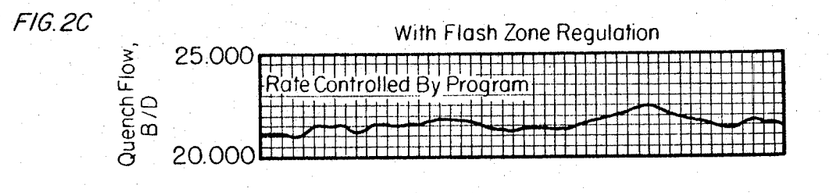
Figure 2D:
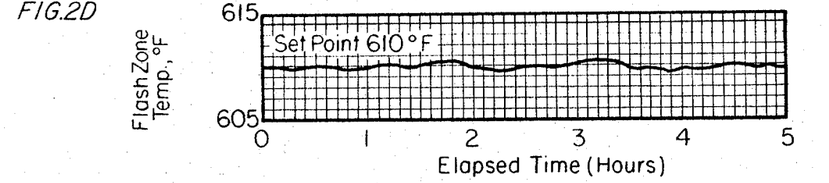
Figure 3A:
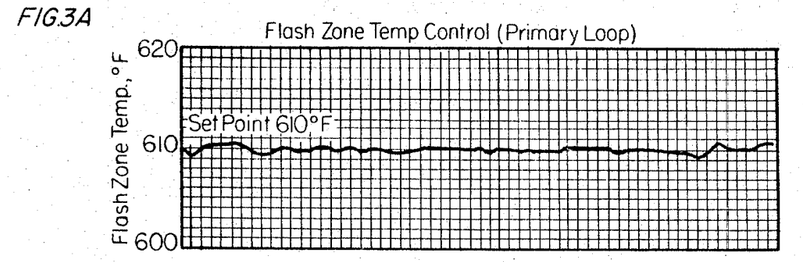
Figure 3B:
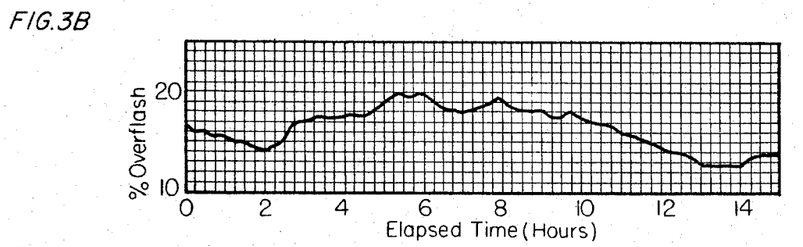
Figure 3C:
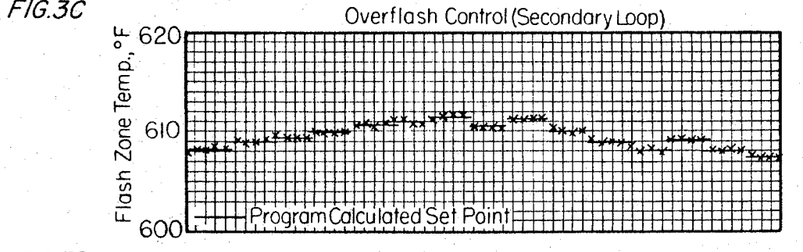
Figure 3D:
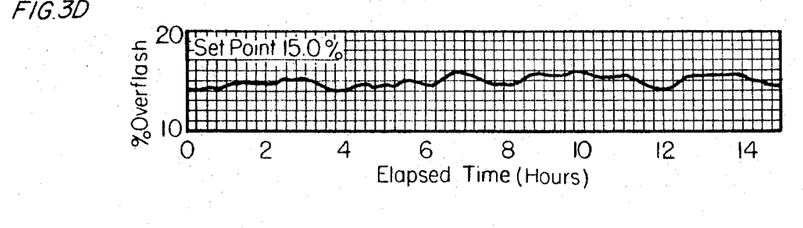

As indicated in FIGURE 1A, the tower is instrumented with analog flow control loops on its product streams, top, bottom (quench) and intermediate refluxes. Distillation analyzers were added to the gasoline and light distillate draw-offs to implement on-stream control of their distillation range. The top of the tower was stabilized by cascading the distillation analyzer to the conventional TRC. The light distillate stream (DFO) was not controlled with a simple analog loop due to the abnormal process time delay inherent to the fractionator at this section of the tower. Regulation of this DFO stream along with the rest of the tower is achieved through the regulation program.

The following shows schematically the hierarchy employed:

The primary regulation loops maintain the DFO quality, the flash zone temperature and intermediate reflux duty at specified set points. The secondary regulation generates new set points for two of the primary loops every fifteen minutes by maintaining fixed liquid to vapor ratios ($L/V$), at the top and bottom of the tower.

The overall control strategy in this program, although developed specifically for the depicted tower, has general applicability to multicomponent, multi-draw distillation columns. This approach does not require the formulation of the complex mathematical model required to describe the behavior of such a system. Rather, it uses empirically developed control equations which may be adapted to other fractionating towers.

In FIGURE 1A, the top of the tower is stabilized by use of a conventional distillation analyzer 9 to maintain stable desired top conditions, thus maximizing recovery of unstabilized gasoline and minimizing wet gas production. A conventional 90% point analyzer 9 was cascaded into the top temperature controller (TRC) 7. The analyzer is used to reset the top temperature. Direct control of this temperature provides the fast response time needed for rapid, stable top tower regulation not inherently possible with a distillation analyzer because of its relatively slow response time. Alternatively as shown in FIGURE 1B the signal from DA 9 may be directed to the computer to provide a signal to SPS 35 which in turn adjusts FRC 32 to control the top recycle rate. In either embodiment the overall response time is minimized as much as possible by locating the sample tap for DA 9 between the overhead condenser 4 and the drum or accumulator 5. This position of the DA 9 sample withdrawal is important in closing the loop in the control stream. The conventional position for sample withdrawal is after the accumulator 5; however, this results in a considerable dead time due to liquid holdup in the accumulator. The dead time may be about 45 minutes which is undesirable in a closed loop control scheme.

Regulation of the rest of the tower is achieved with the process control computer. Using the tower control program, the computer manipulates three set point stations, 13, 20, 25. These stations provide the set points for the flow controllers on the distillate fuel oil (DFO), drawoffs, and quench and intermediate reflux. These control loops will be discussed individually.

Regulation of the tower is divided into two levels of regulation—primary and secondary. The primary regulation loops vary the quench and intermediate reflux flow rates to maintain the flash zone temperature and the intermediate reflux duty at set points specified by the operators. Primary regulation also controls DFO withdrawal. These primary regulation loops help to stabilize the tower by smoothing out process disturbances.

At the next level, secondary regulation, set points for two of the primary regulation loops are determined. The set points for these secondary loops are percent overflash in the tower flash zone and the liquid/vapor, $L/V$, ratio on the top tray. Overflash in this case is defined as the amount of material flashed up to the bottom tray 2 that returns to the flash zone expressed as a percentage of the total bottoms flow rate. Internal flow calculations are made using heat and material balance methods, discussed further below.

Quench primary control loops

Primary regulation of the quench loop is control of the quench flow rate to maintain a specified tower flash zone temperature. Secondary regulation will maintain a specified overflash in the bottom of the tower. A certain minimum amount of overflash is required; more than minimum adds little to product quality and requires additional top or intermediate reflux to get the material back in the bottoms where it belongs. In the quench loop, a set point of 590–640° F. (flash zone temp.) specifies that primary regulation is being used, and this would be initially set by the operator. A value of 15–35 (percent overflash) is entered for the set point by the computer when the quench loop is under secondary regulation. A new flash zone temperature will then be specified by the computer to maintain a desired overflash. The examples of flash zone temperatures and percent overflash values may be varied to meet requirements of the system under control.

Maintaining the tower flash zone temperature can be accomplished with a simple feedback equation. However, as with most of the control programs, logic checks are made around the control equation to safeguard against improper control actions. If any of the process limits have been exceeded, a message is typed informing the operator. These limits are set by considerations of the physical limitations of the equipment. No control action that would drive the system past the limit is taken; however, an action that would bring the system into limits will be made. Examples of limits which may be used include values for recycle gravity, tower bottoms and quench flow rates and flash zones temperatures. If the predetermined limits are exceeded for a period of time the quence loop will deactivate itself.

If these checks are passed, a control action is calculated once a minute using the proportional and reset program referred to below. A suitable control process gain used in the equation, as determined by unit tests, is 300 b./d. of quench per ° F. flash zone temperature; this value is dependent upon conditions in the unit being controlled. Furthermore this gain is not constant but dependent upon a heat balance at the quench point and therefore is varied to compensate for tower feed changes and the temperature drop through the quench exchangers.

A comparison of control performance is shown in FIGURE 2. After the primary loop was closed and tuned, the control was tightened, responding quickly to set point changes and holding the flash zone temperature ± 1° F. from a previous range of about ± 3° F. FIGURES 2A and 2B represent tower operation without the assistance of the process computer. The flow rate of the quench stream was fixed at 17,000 barrels per day by adjustment of valve 27. In this mode of operation the flash zone temperature, as sensed by T23, typically varied across a range of 612 to 617° F. FIGURES 2C and 2D depict tower operation with the assistance of computer 31, as set forth in FIGURE 1A. The quench flow rate was controlled through valve 27 in accordance with signals received through the analog controllers from the process computer. The set point for the flash zone temperature was 610° F. This temperature was maintained at less than ± 1° F. by adjustment of the quench flow from about 21,000 to 22,500 barrels per day.

Intermediate reflux primary loop

The primary regulation of the intermediate reflux control loop is regulation of the flow to maintain a specified heat removal with the intermediate reflux. The set point is B.t.u. removed/lb. of tower feed. Secondary regulation will maintain a specified liquid/vapor ratio on the top tray. Here again a certain minimum ratio is required to make maximum gasoline specification. More than this minimum is of little value. As the tower is on top controlled by the TRC and DA a suitable way to decrease the liquid or reflux on the top tray is to increase the intermediate reflux. The secondary control loop calculates the $L/V$ ratio on the top tray and calculates what change must be made to the intermediate reflux to obtain this desired $L/V$ ratio on the top tray. Selection of primary or secondary regulation is determined by the set point value. In the intermediate reflux loop, a set point of 70–130 B.t.u./bl. charge feed initially set by the operator specifies primary control (duty), a set point of .30 to .50 ($L/V$ ratio) specifies secondary control whereupon an intermediate duty will be specified by the computer to maintain this ratio. Any other value of the set point will result in deactivation of that loop.

Controlling the intermediate reflux to maintain a heat duty per pound of tower feed provides the regulation best suited to the secondary control system. The current duty is calculated once a minute, compared with the set point and control action taken based on the proportional plus reset control program. The same type of logic checks given for the quench loop are made and, if failure occurs, no action is taken and the loop is deactivated.

This control loop will maintain a relative heat removal with intermediate reflux despite feed changes and other process disturbances. Without this control loop, the intermediate reflux rate would be held constant and the resultant top temperature disturbances compensated for by changing the top reflux rate.

Secondary control program

The next step toward minimizing the tower operating costs is to regulate the percent overflash in the bottom of the tower and the $L/V$ ratio on the top tray. Because of the overall systems dynamics, the internal tower conditions must be time staged.

The overflash and top tray $L/V$ are calculated once every 15 minutes since the tower dynamics take 20–25 minutes to come to equilibrium. New set points to the primary control loops are normally specified once an hour. However, the secondary control loop is executed every 15 minutes to check that the minimum overflash is not violated. If it is, action is taken to restore it to its set point.

Before any calculations are made, confidence in the input data is obtained by making an overall material balance around the tower. If the closure is within 2% the program proceeds; if not, internal flow calculations are not made and the previous set points are retained for the next time period. The quench and intermediate reflux loops both affect the overflash. This interaction is compensated for in the calculation by first calculating the intermediate reflux duty change to correct for the $L/V$ error and then calculating the quench change considering both the overflash error and the intermediate reflux change.

A message is typed out each hour informing of the current values of these variables and the set points for the next hour. By examination of this message the operator can tell easily if primary or secondary control has been specified, how far the tower is from the set point and what changes the computer will be making in the next hour to correct for any deviation.

The following is an example of the computer printout.

|  | Set point | Unit | Calculated | Computer |
|---|---|---|---|---|
| Intermediate reflux | .41 | 118 | .405 $L/V$ | 115 |
| Quench | .22 | 605 | .21 overfl. | 606 |

The Set Point value indicates the desired set point being used in the control scheme, and in this example indicates that the secondary control loop is being utilized. These values indicate a desired liquid/vapor ratio of .41 in the intermediate reflux control loop and an overflash value of .22 in the quench control loop. The Unit values indicate that actual present conditions in the tower are an intermediate reflux duty of 118 B.t.u./lb. of feed and a flash zone temperature of 605° F. The Calculated values are the current liquid/vapor ratio (.405) and overflash (.21) as calculated. The Computer values indicate what set point will be specified by the secondary control program for the next hour of operation, i.e., 115 B.t.u./lb. of feed for reflux duty and 606° F. for flash zone temperature. Therefore it is determined that to drive the unit from a current calculated value of .405 $L/V$ to a desired value of .41 $L/V$ the actual reflux duty of 118 B.t.u./lb. of feed must be changed to 115 B.t.u./lb. of feed. This change of reflux duty will be effected by adjustment of valve 17 as outlined above, in accordance with the control equation referred to below. Similarly, to drive the unit from a current calculated overflash of .21 to a desired overflash of .22, the actual flash zone temperature of 605° F. will be changed to 606° F. by adjustment of valve 27.

Statistical analyses of the hourly tower heat and material balance indicated the overflash varied over a range of 10–50%. The $L/V$ ratio varied from .35 to .50. With the secondary loop closed these variations are held to ±1%. In order to maintain this degree of regulation in the flash zone, the temperature of the flash zone has varied as much as 15° F. with changes in recycle rate and DFO draw. Thus temperature control alone is not adequate to regulate the percent overflash within ±1%. However, it is necessary to regulate the flash zone temperature and implement overflash control by means of a time-staged cascade system because of the response times involved. Flash zone temperature responds very quickly, whereas internal tower dynamics cause overflash to come to equilibrium rather slowly in comparison.

A plot of typical flash zone temperature and percent overflash variations with both primary and secondary modes of control at constant recycle rate and DFO 90% pt. is presented in FIGURE 3. With primary regulation (flash zone temperature set point—610° F.), flash zone temperature varied within ±1° F. of set point (FIGURE 3A) while overflash ranged from 13% to 20% (FIGURE 3B). Under secondary regulation (overflash set point—15%), overflash stayed within ±1% of set point (FIGURE 3D) and flash zone temperature within ±1° F. of set point (FIGURE 3C). However, the flash zone set point varied over a range of 608–612° F. to hold the overflash constant.

By operating the tower at minimum overflash and minimum top reflux rate, a maximum amount of heat is removed from the tower as preheat. Overhead condenser duty is minimized and a maximum amount of gasoline condensed; as a result, compressor loadings are decreased. Under these conditions, the total operating costs are at a minimum. These minimum internal tower conditions must be determined by unit testing since tray performances vary with each installation and operation range. Plant tests establish minimum values for the overflash and the $L/V$ ratio by a stepwise reduction of the set points for the secondary regulation program.

DFO control loop

Controlling distillate fuel draw rate with a distillation analyzer is sometimes possible by cascading the analyzer into the DFO flow controller. However, this control system did not cope with the response of the system for this specific application. The response, as indicated on the analyzer, to a step change in DFO draw rate is comprised of eight minutes of apparent dead time and a first order lag with a 30-minute time constant. This dead time can be approximately separated into 1 minute for transportation lag, 2 minutes for analyzer and sample system and 5 minutes of process dead time. The apparent long process dead time may be explained by the large intermediate reflux in this portion of the tower which serves as a buffer to the system response. This problem was solved with the control computer by sampling at discrete time intervals. In this case, a time period was chosen that would encompass the dead time. Every 10 minutes 90% analyzer is compared to the set point and corrective action taken.

The DFO control program is executed once a minute. If a logic check fails, control action will be frozen at the current flow set point until all checks pass. If all of the checks are passed, a control action will be taken every 10 minutes. A control program using proportional, derivative and integral modes is used. For the normal operating range, the process gain is 1% of the DFO flow/1° change in 90% point. An explanation of the control equation is given below.

Figure 4A:
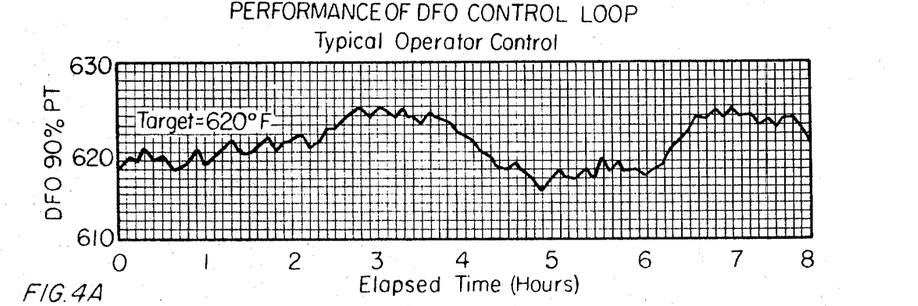
Figure 4B:
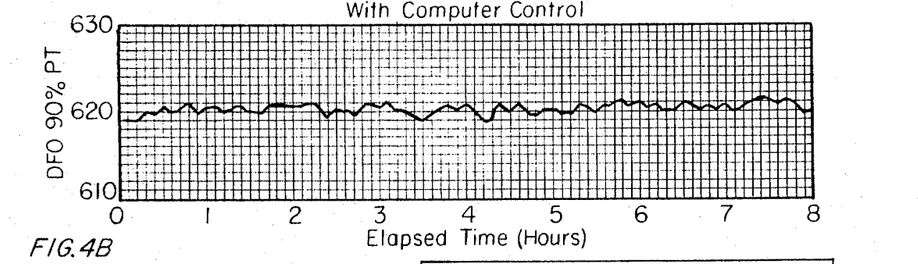

This program will maintain a desired 90% point ±2° F. Control of this loop permits 125–150 b./d. of additional DFO to be drawn without exceeding maximum 90% pt. specifications. This increment is realized both by reducing DFO give away through better control and by approaching more closely the maximum DFO draw without exceeding final product specifications. A comparison of performance between typical operator control and computer control is shown in FIGURE 4. FIGURE 4A depicts typical operator adjustment of DFO flow rate through valve 10 in accordance with observed value of end point analyzer; the deviation is ±5° F. FIGURE 4B illustrates that with the use of the process computer, as shown in FIGURE 1A, the 90% end point value is very closely controlled.

The DFO loop is independent of the secondary control program and controls DFO flow rate to hold a desired 90% pt. A desired 90% pt. is specified by manual input. The program will accept as appropriate set points those between 590–630° F. The program will deactivate itself if an illegal set point is entered, if the analyzer indicates less than 580° F. or more than 640° F., or if the set point station reaches an adjustable limit.

Control equation

The hierarchy of control developed for this program is generally applicable to most refinery multi-draw fractionating towers. Control equations used were based on general heat and material balance considerations and tuned for this program from on-line information on the tower. This empirical approach proved sufficient for this regulation purpose making the development of a theoretical model unnecessary.

The following equation provides proportional, reset and derivative action. All three control loops use proportional and reset action; only the DFO loop uses the derivative action. The absolute set point subroutine is called by the program to change the set points to the value specified.

(1) New Set Point$=SUMEX+G[P \times E +R \times E+D(E-EOLD)]$

SUMEX=Set equal to set point position on initialization and redefined after each control action to include the current reset action.

$$\left(SUMEX_t = \text{Initial Position}_{t_0} + R \int_0^{t-1} e \, dt \right)$$

E=Error (process deviation from set point)
P=Proportional gain
R=Reset gain
D=Derivative gain
EOLD=Error at last control action (E−EOLD=rate of deviation from set point)
G=Process gain The following are examples of values used in the control equation.

|   | Quench stream | DFO | Intermediate reflux |
|---|---|---|---|
| P | .3 | .3 | .5 |
| R | .2 | .3 | .1 |
| D |   | .5 |   |
| G | 300 b./d./° F. | 1% DFO yield, ° F. | Reflux rate/desired duty. |

The value of G may be modified during operation of the control program.

It has been found more convenient in the control equations to make reset and derivative constants independent of the proportional gain.

Values for the proportional, reset and derivative gain are tuned in on-line just as an analog controller is tuned. Initially the gains are manual inputs and entered through the enter data function on the operator's console. When the loop is tuned, the constants are made a permanent part of the control equations in each program.

Heat and material balance, V/L ratios

The tower program calculates a tower heat balance and determines internal flow rates on the top and bottom draw trays. These flow rates are calculated by a heat and material balance around each of these trays. An overall heat balance is made to calculate the heat removal in various sections of the tower. In making the tower heat balance, it is first necessary to calculate a material balance. The feed is calculated from the products leaving the tower plus process and purge stream. An allocation of the total heat input to overhead condenser, intermediate reflux and quench duties, and to heat contained in the products normally leaves about 1 to 3% of the heat to be assigned to tower losses. A deviation of the heat and material balance equations used to calculate the liquid from the top tray is shown below (see FIGURES 5, 1A, 1B). Similar calculations are made at the bottom tray.

Figure 5:
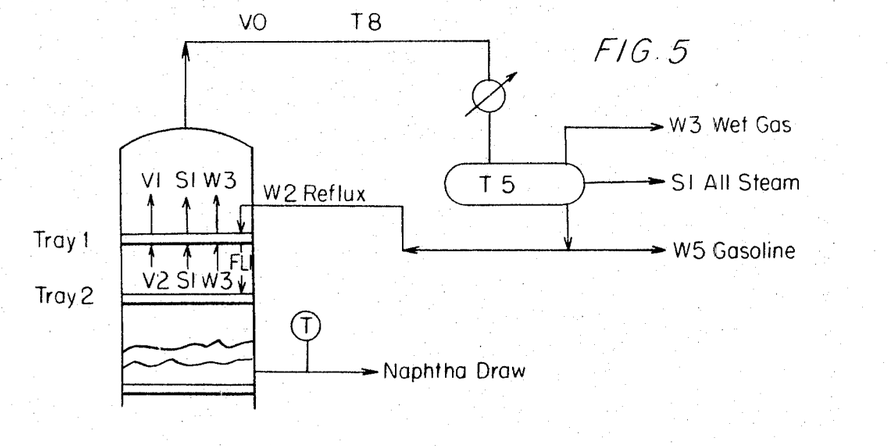
FIGURE 5 depicts the variables involved in analysis of a portion of tower operation.

(2) $V1=W2+W5$
Vapor to Tray $1=V2+S1+W3$ (3) $VO=V1+S1+W3$

Material balance Tray 1

(4) $V2+S1+W3+W2=V1+S1+W3+FL1$
(5) $V2=V1+FL1-W2$

Heat balance Tray 1

(6) Heat in$=W3(HV_{T2})+S1(HS_{T2})$
$+W2(HL_{T5})+V2(HV_{T2})$ (7) Heat out$=W3(HV_{T8})+S1(HS_{T8})$
$+FL1(HL_{T8})+V1(HV_{T8})$ Solve for FL1—Substitute Eq. 3 for V2

(8) $FL1(HL_{T8})=\Delta HW_3+\Delta HS1+W2(HL_{T5})$
$-V1(HV_{T8})+V1(HV_{T2})+FL1(HV_{T2})-W2(HV_{T2})$ Collect terms:

(9)

$$FL1 = \frac{\Delta HW_3+\Delta HS1+V1(HV_{T2}-HV_{T8})-W_2(HV_{T2}-HL_{T5})}{HL_{T8}-HV_{T2}}$$

Nomenclature:

FL1—Liquid from Tray 1, calculated #/hr.
$HL_{T5}$—Enthalpy of Hydrocarbon Liquid at T5 B.t.u./lb. etc.
$HV_{T8}$—Enthalpy of Hydrocarbon Vapor at T8 B.t.u./lb. etc.
S1—Steam in tower, from drum 5 (steam through tower not shown) #/hr.
T2—Temperature of tray 2 (not shown) calculated by interpolation from T8 and temperature of naphtha draw, FIGURE 1B
T5—Temperature of gasoline from drum 5, see FIGURE 1B
T8—Temperature of tray 1, obtained from T8, FIGURE 1A
VO—Vapor overhead of tower, calculated
V1—Gasoline+Reflux leaving tray 1 as vapor calculated, #/hr.
V2—Gasoline+Internal Reflux leaving tray 2 as vapor, calculated, #/hr.
W2—Top Reflux, see flowmeter, FIGURE 1B, #/hr.
W3—Wet Gas Fixed throughout tower, see flowmeter, FIGURE 1B, #/hr.
W5—Gasoline Product, see flowmeter, FIGURE 1B, #/hr.

Control program

Figure 6:
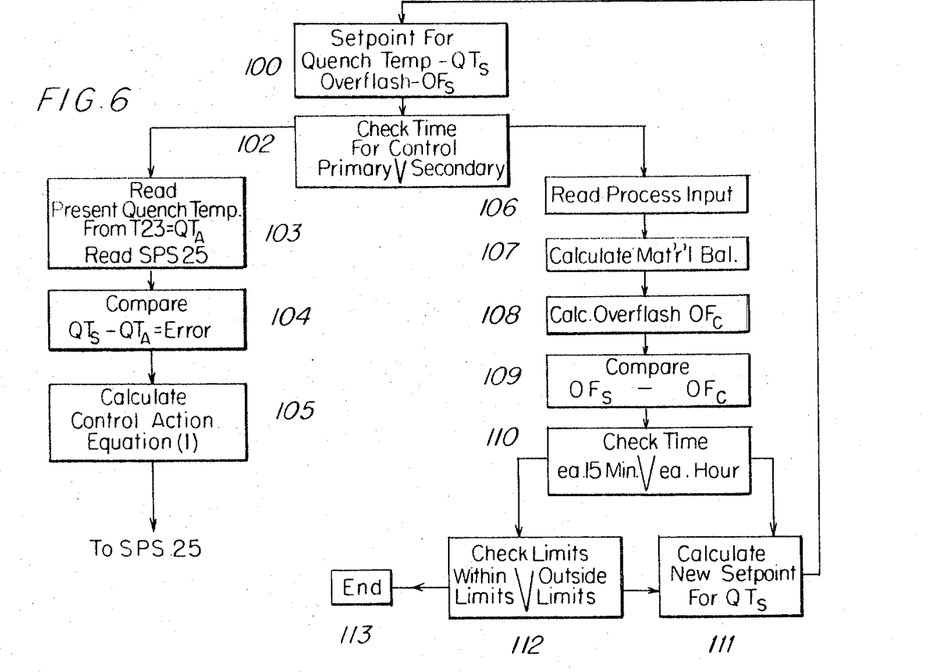
FIGURE 6 is a logic flow diagram for a feature of this invention.

A simplified logic flow diagram for the program used to control operation of the tower bottom as shown in FIGURE 6. This flow diagram has been simplified by elimination of the many details necessary for obtaining information from the tower operation, for checking set point station adjustable limits, checking process limits and secondary control interrelations. The program is inititiated by manually entering the desired set points for quench temperature $QT_S$, and overflash set point $OF_S$, 100. At 102 the time is calculated for appropriate activation of the primary and secondary control loops. At 103 the actual quench temperature from thermocouple T23 is determined $QT_A$, and the position of set point station 25 is also obtained. The difference between set point value of the quench temperature and the actual quench temperature $(QT_S-QT_A)$ is the value of an error signal E, obtained from 104. The error E is used to determine a new set point in accordance with control Equation 1, 105. This signal is then directed to SPS 25 to readjust it to the new point position.

When the timer unit 102 actuates the secondary control loop the process inputs (see FIGURE 1B) are read by the computer 106. From these values a material and heat balance around the unit is calculated 107. From the material and heat balance a calculated value of the overflash, $OF_C$, at the bottom of the tower is obtained, 108. The error signal from 109 is equal to the difference between the desired overflash and the calculated overflash, $OF_S-OF_C$. Depending upon the time 110, this overflash signal will be used to calculate a new set point for the desired quench temperature 111, and this value will be used to adjust the initial quench temperature set point 100. This control action may be scheduled for once each hour. At appropriate intervals when the overflash error is calculated, for example, every fifteen minutes, if it is within limits 112, no action will be taken 113. If the calculated overflash is not within present limits the quench temperature set point will immediately be adjusted 112–111.

From the above description it should be clear how an entire program for the tower of FIGURE 1A may be devised to incorporate all of the features of the previously disclosed control systems.

The improved performance which resulted from the modified instrumentation and use of the regulation program of this invention is summarized in Table 1.

TABLE 1.—COMPARISON OF TOWER PERFORMANCE

|  | Before | Present |
|---|---|---|
| I. Effect of tower top instrumentation modifications: |  |  |
| (a) Unstabilized gasoline 90% Pt. variations, °F | 5 | 1 |
| (b) Increased gasoline recovery, b./d |  | 50–80 |
| II. Effect of regulation program: |  |  |
| Top reflux rate, b./d | 9,500 | 7,000 |
| Top reflux variation, b./d | 800 | 300 |
| O'hd condenser duty, MM B.t.u./hr | 51 | 44 |
| Wet gas make (same severity), M lbs./hr | 66 | 60 |
| DFO 90% pt. variations, °F | 7 | 2 |
| DFO recovered from STB, b./d |  | 125–150 |
| Intermediate reflux circ., M b./dg | 12 | 20 |
| Intermediate reflux return temp., °F | 220 | 295 |
| Average flash zone temp., °F | 620 | 610 |
| Typical heat recovery: |  |  |
| From inter. reflux, MM B.t.u./hr | 8 | 11 |
| From quench | 26 | 30 |
| Total heat recovery | 34 | 41 |
| Time required to pass steady state after recycle rate change, hrs | 8 | 4–6 |

Additional benefits derived from the regulation program and modified instrumentation have resulted in improved premium product recovery, lower operating costs, and smoother reactor performance. Faster recovery from upset or changing conditions, and reduction of the extent of those upsets minimizes the effects of the interaction between the reactor and the tower because of the recycle coupling effect; e.g. for a reactor upset caused by a change in recycle ratio, the line-out time has been reduced from about eight hours to from four to six hours. The regulation in wet gas make is particularly beneficial during the summer months when the wet gas rate is the limiting operating constraint. Lowered gas make allows either higher severity or reactor throughput.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:
1. A method of fractional distillation of oil comprising:
feeding a stream of distillant into a fractionator,
withdrawing a first fraction from the lower portion of said fractionator,
refluxing a portion of the first fraction through a first fraction heat exchanger to said fractionator,
generating a signal representative of the temperature of the lower portion of said fractionator,
comparing said temperature signal with a reference signal to generate a temperature control signal,
controlling the flow rate of the refluxed portion of said first fraction to maintain a predetermined flash zone temperature in the lower portion of said fractionator,
periodically adjusting said predetermined flash zone temperature in response to a predetermined percent overflash value,
withdrawing a second fraction from an intermediate point in said fractionator,
refluxing a portion of said second fraction through a second fraction heat exchanger to said fractionator,
controlling the flow rate of the refluxed portion of said second fraction to provide a predetermined value of heat removal from said tower,
generating a signal representative of the liquid/vapor ratio in the upper portion of said fractionator,
periodically adjusting said predetermined value of heat removal in response to the liquid/vapor ratio signal to maintain a predetermined liquid/vapor ratio in the upper portion of said fractionator,
withdrawing a third fraction from the upper portion of said fractionator,
passing said third fraction through a third fraction heat exchanger and an accumulator,
recycling a portion of the output of said accumulator to said fractionator,
generating a signal representative of the distillation point of said third fraction between said third fraction heat exchanger and said accumulator,
controlling the flow rate of the recycled portion of said third fraction in response to said third fraction distillation point signal,
withdrawing a product component from said fractionator, and
controlling the rate of withdrawal of said product component to maintain a predetermined distillation point for said product component.

2. The method of claim 1 wherein the step of controlling the flow rate of the recycled portion of said third fraction comprises
generating a said representative of the temperature of the upper portion of said fractionator,
controlling the flow rate of the recycled portion of said third fraction in response to said upper portion temperature signal, and
adjusting the amount of flow rate control of the recycled portion in response to said third fraction distillation point signal.

3. A multicomponent, multi-draw distillation column comprising:
means for feeding a stream of distillant into said column,
means for withdrawing a first fraction from the lower portion of said column,
a first fraction heat exchanger,
means for refluxing a portion of said first fraction through said first fraction heat exchanger to said column, means for generating a signal representative of the temperature of the lower portion of said column, means for comparing said lower portion temperature signal with a lower portion reference signal to generate a lower portion temperature control signal, means responsive to said lower portion temperature control signal for controlling the flow rate of the refluxed portion of said first fraction to maintain a predetermined flash zone temperature in the lower portion of said column, means for periodically adjusting said lower portion reference signal in response to a predetermined percent overflash value, means for withdrawing a second fraction from an intermediate point in said column, a second fraction heat exchanger, means for refluxing a portion of said second fraction through said second fraction heat exchanger to said column, means for controlling the flow rate of the refluxed portion of said second fraction to provide a predetermined value of heat removal from said column, means for generating a signal representative of the liquid/vapor ratio in the upper portion of said column, means for periodically adjusting said predetermined value of heat removal in response to the liquid/vapor ratio signal to maintain a predetermined liquid/vapor ratio in the upper portion of said column, a third fraction heat exchanger, an accumulator downstream of said third fraction heat exchanger, means for withdrawing a third fraction from the upper portion of said column and passing said third fraction through said third fraction heat exchanger and said accumulator, means for recycling a portion of the output of said accumulator to said column, means operatively connected to a point between said third fraction heat exchanger and said accumulator for generating a signal representative of the distillation point of said third fraction, means for controlling the flow rate of the recycled portion of said third fraction in response to said third fraction distillation point signal, means for withdrawing a product component from said column, and means for controlling the rate of withdrawal of said product component to maintain a predetermined distillation point for said product component.

References Cited

UNITED STATES PATENTS

| | | | |
|---|---|---|---|
| 3,000,812 | 9/1961 | Boyd | 196—132 |
| 3,143,643 | 8/1964 | Flugel et al. | 202—160 |
| 3,224,947 | 12/1965 | Lupfer | 202—106 |
| 3,296,097 | 1/1967 | Lupfer | 202—160 |
| 3,296,121 | 1/1967 | Potts | 203—2 |
| 3,301,778 | 1/1967 | Cabbage | 196—132 |
| 3,320,158 | 5/1967 | Potts | 208—358 |
| 3,331,753 | 7/1967 | Foester | 196—132 |
| 3,342,699 | 9/1967 | Rijnsdorp | 203—3 |

OTHER REFERENCES

Phister et al.: Control Engineering, vol. 4, No. 6, June 1957, pp. 129–136.

Adams: The Oil and Gas Journal, May 27, 1963, vol. 61, No. 21, pp. 91–93, 96 and 97.

WILBUR L. BASCOMB, Primary Examiner

U.S. Cl. X.R.

196—132; 202—160; 203—1, 2, 3, 98, 99; 235—151.12

PO-1050
(5/69)

UNITED STATES PATENT OFFICE
CERTIFICATE OF CORRECTION

Patent No. 3,463,725        Dated August 26, 1969

Inventor(s) Benedict Macfarlane and Charles A. Jones III

It is certified that error appears in the above-identified patent and that said Letters Patent are hereby corrected as shown below:

Column 12, line 59, "said" should read --signal--.

Signed and sealed this 22nd day of June 1971.

(SEAL)
Attest:

EDWARD M. FLETCHER, JR.        WILLIAM E. SCHUYLER, JR.
Attesting Officer                Commissioner of Patents